(12) United States Patent
Blanchette et al.

(10) Patent No.: US 8,958,705 B2
(45) Date of Patent: Feb. 17, 2015

(54) METHODS AND SYSTEMS FOR A PULSED LASER SOURCE EMITTING A PREDETERMINED OUTPUT PULSE PROFILE

(75) Inventors: Guillaume Blanchette, Zurich (CH); Richard Murison, St-Lazare (CA); Benoit Reid, Laval (CA)

(73) Assignee: ESI-Pyrophotonics Lasers Inc., Qc (CA)

( * ) Notice: Subject to any disclaimer, the term of this patent is extended or adjusted under 35 U.S.C. 154(b) by 216 days.

(21) Appl. No.: 13/350,606

(22) Filed: Jan. 13, 2012

(65) Prior Publication Data

US 2013/0183046 A1 Jul. 18, 2013

(51) Int. Cl.
*H04B 10/04* (2006.01)

(52) U.S. Cl.
USPC ............................. 398/195; 398/197; 398/198

(58) Field of Classification Search
None
See application file for complete search history.

(56) References Cited

U.S. PATENT DOCUMENTS

| 5,619,321 | A * | 4/1997 | Artiglia et al. ............... 356/73.1 |
| 5,703,711 | A * | 12/1997 | Hamada .................... 359/341.41 |
| 5,955,921 | A | 9/1999 | Ide et al. |
| 7,505,196 | B2 * | 3/2009 | Nati et al. ...................... 359/333 |
| 7,667,889 | B2 * | 2/2010 | Murison et al. ............ 359/341.3 |
| 7,742,511 | B2 * | 6/2010 | Murison et al. ................. 372/26 |
| 2003/0142390 | A1 | 7/2003 | Parry et al. |
| 2003/0198262 | A1 * | 10/2003 | Tanner et al. ................... 372/25 |
| 2006/0087721 | A1 | 4/2006 | Maeda |
| 2008/0298417 | A1 * | 12/2008 | Atkins et al. ............... 372/50.22 |
| 2011/0170564 | A1 | 7/2011 | Desbiens et al. |

FOREIGN PATENT DOCUMENTS

JP 11-55189 A 2/1999

OTHER PUBLICATIONS

Cvijetic, Optical Transmission: system engineering, 2004, Artech House Inc., p. 172.*
International Search Report of PCT/US2012/067733, 2 pages.
Written Opinion of PCT/US2012/067733, 6 pages.

* cited by examiner

*Primary Examiner* — Ken Vanderpuye
*Assistant Examiner* — Jai Lee
(74) *Attorney, Agent, or Firm* — Haynes Beffel & Wolfeld LLP

(57) ABSTRACT

A method of operating an optical amplifier includes determining a gain of the optical amplifier and providing a modulator drive signal to an optical signal source. The modulator drive signal is a function of the gain of the optical amplifier. The method also includes producing an input optical signal using the optical signal source. The input optical signal includes a first plurality of pulses, each of the first plurality of pulses having an amplitude related to the modulator drive signal. The method further includes coupling the input optical signal to the optical amplifier and amplifying the input optical signal using the optical amplifier to produce an output optical signal including a second plurality of pulses.

27 Claims, 11 Drawing Sheets

METHODS AND SYSTEMS FOR A PULSED LASER SOURCE EMITTING A PREDETERMINED OUTPUT PULSE PROFILE

BACKGROUND OF THE INVENTION

Pulsed laser sources, such as Nd:YAG lasers, have been used to perform laser-based material processing for applications such as ablating, marking, engraving, micro-machining, cutting, and scribing. More recently, laser systems based on fiber gain media have been developed. In some of these fiber-based laser systems, fiber amplifiers are utilized. Some optical amplifiers and lasers utilizing a fiber gain medium are optically pumped, often by using semiconductor pump lasers. The fiber gain medium is typically made of silica glass doped with rare-earth elements, such as ytterbium or erbium. Ytterbium is used for optical amplifiers and lasers emitting in the 1020 nm-1100 nm wavelength range.

When the laser is operated in a pulse-on-demand mode, the first optical pulse in a series of pulses tends to be more powerful than the following pulses in the series. This situation is sometimes referred to as the first pulse problem and occurs because the energy stored in the laser gain medium, which is depleted significantly after the first pulse, is not fully replenished by the time the next and subsequent pulses pass through the gain medium. However, if the next pulse arrives after the gain medium is fully recovered, then another pulse similar to the first pulse will be produced. Hence, depending on the pulse repetition rate, which can be varied during operation of the laser, the energy in each pulse will generally vary as a function of the state of the gain medium. In laser processing applications, this behavior is generally undesirable because inconsistency in laser pulses will often produce correspondingly inconsistent results during processing operations.

Thus there is a need in the art for fiber-based amplifiers with repeatable output pulse characteristics independent of the pulse repetition frequency.

SUMMARY OF THE INVENTION

The present invention relates generally to the field of optical amplifiers and lasers. More specifically, the present invention relates to methods and systems for providing gain-compensated laser pulses useful for industrial applications such as ablating, trimming, marking, cutting, and welding. Merely by way of example, the invention has been applied to a laser source with real-time tunable characteristics including pulse width, peak power, repetition rate, and temporal pulse shape. However, the present invention has broader applicability and can be applied to other laser sources and optical amplifier systems.

According to an embodiment of the present invention, a method of operating an optical amplifier is provided. The method includes determining a gain of the optical amplifier and providing a modulator drive signal to an optical signal source. The modulator drive signal is a function of the gain of the optical amplifier. The method also includes producing an input optical signal using the optical signal source. The input optical signal includes a first plurality of pulses, each of the first plurality of pulses having an amplitude related to the modulator drive signal. The method further includes coupling the input optical signal to the optical amplifier and amplifying the input optical signal using the optical amplifier to produce an output optical signal including a second plurality of pulses.

According to another embodiment of the present invention, a method of operating an optical system is provided. The method includes providing a seed optical signal, coupling the seed optical signal into a first optical amplifier, and amplifying the seed optical signal using the first optical amplifier to produce a pre-amplified optical signal. The method also includes determining a gain of the first optical amplifier, determining a gain of a second optical amplifier, and providing a modulator drive signal to an optical modulator. The modulator drive signal is a function of the gain of the first optical amplifier and the gain of the second optical amplifier. The method further includes modulating the pre-amplified optical signal using the optical modulator to produce a modulated optical signal that includes a first plurality of pulses, each of the first plurality of pulses being characterized by an amplitude that is a function of the modulator drive signal, coupling the modulated optical signal into the second optical amplifier, and amplifying the modulated optical signal using the second optical amplifier to produce an output optical signal including a second plurality of pulses.

According to an alternative embodiment of the present invention, an optical amplifier system is provided. The optical amplifier system includes an optical signal source operable to provide an input optical signal comprising a first plurality of pulses and control electronics coupled to the optical signal source. The optical amplifier system also includes an optical amplifier operable to amplify the input optical signal, the optical amplifier having an input and an output. The optical signal source is optically coupled to the input. The optical amplifier system further includes a feedback loop coupled to at least one of the output of the optical amplifier or the input of the optical amplifier and operable to receive a feedback signal related to a gain of the optical amplifier. The feedback signal is coupled to the control electronics and the control electronics are operable to provide a modulator drive signal based on the feedback signal. Each of the first plurality of pulses of the input optical signal are characterized by a temporal amplitude profile that is a function of the modulator drive signal.

According to another alternative embodiment of the present invention, an optical system is provided. The optical system includes an optical signal source operable to provide a seed optical signal and an optical modulator operable to modulate the seed optical signal to produce a modulated optical signal comprising a first plurality of pulses. The optical system also includes control electronics operable to provide a modulating drive signal to the optical modulator and an optical amplifier operable to amplify the modulated optical signal, the optical amplifier having an input and an output. The input of the optical amplifier is coupled to an output of the optical modulator. The optical system further includes a feedback loop coupled to the output or the input of the optical amplifier and operable to detect a feedback signal related to a gain of the optical amplifier. The feedback signal is coupled to the control electronics. The control electronics are operable to provide the modulator drive signal based on the feedback signal and the amplitudes of the first plurality of pulses of the modulated optical signal are a function of the modulator drive signal.

According to a specific embodiment of the present invention, an optical system is provided. The optical system includes an optical signal source operable to produce a seed optical signal and a first optical amplifier operable to pre-amplify the seed optical signal to produce a pre-amplified optical signal, the first optical amplifier having an input and an output. The input of the first optical amplifier is coupled to the optical signal source. The optical system also includes an optical modulator coupled to the output of the first optical amplifier and operable to modulate the pre-amplified optical signal to produce a modulated optical signal comprising a first plurality of pulses and control electronics operable to provide a modulating drive signal to the optical modulator. The optical system further includes a second optical amplifier operable to amplify the modulated optical signal, the second optical amplifier having an input and an output. The input of the second optical amplifier is coupled to an output of the optical modulator. Furthermore, the optical system includes a first feedback loop coupled to the output or the input of the first optical amplifier and operable to detect a first feedback signal related to a gain of the first optical amplifier and a second feedback loop coupled to the output or the input of the second optical amplifier and operable to detect a second feedback signal related to a gain of the second optical amplifier. The first feedback signal and the second feedback signal are coupled to the control electronics and the control electronics are operable to provide the modulator drive signal based on the first feedback signal and the second feedback signal. The amplitudes of the first plurality of pulses of the modulated optical signal are a function of the modulator drive signal.

According to an alternative embodiment of the present invention, a method of operating an optical amplifier or chain of optical amplifiers in pulsed mode is characterized by the adjustment of the optical signal amplitude relatively to the optical amplifier(s) gain fluctuations to conserve the optical output's temporal pulse shape and energy characteristics independently of the pulsing sequence characteristics. The optical amplifier(s) actual gain is determined in some embodiments based on either a measured amplified spontaneous emission signal (i.e., based on feedback signal levels from the optical amplifiers), by recording of the electrical trigger sequence that triggers the optical input signal source, or combinations thereof. According to various embodiments, the adjusted optical input signal is obtained by the action of any controllable optical component that serves as an amplitude modulator or is directly obtained by directly modulating the amplifier(s) optical signal source. As described herein, the feedback signal enables pre-compensation of the amplitude profile of the input signals as a function of the gain in the amplifiers.

Numerous benefits are achieved by way of the present invention over conventional techniques. For example, embodiments of the present invention provide an amplifier system that utilizes information related to the amplifier gain to pre-compensate for amplifier characteristics to provide a predetermined amplified output pulse. These and other embodiments of the invention along with many of its advantages and features are described in more detail in conjunction with the text below and attached figures.

DETAILED DESCRIPTION OF SPECIFIC EMBODIMENTS

Figure 1:
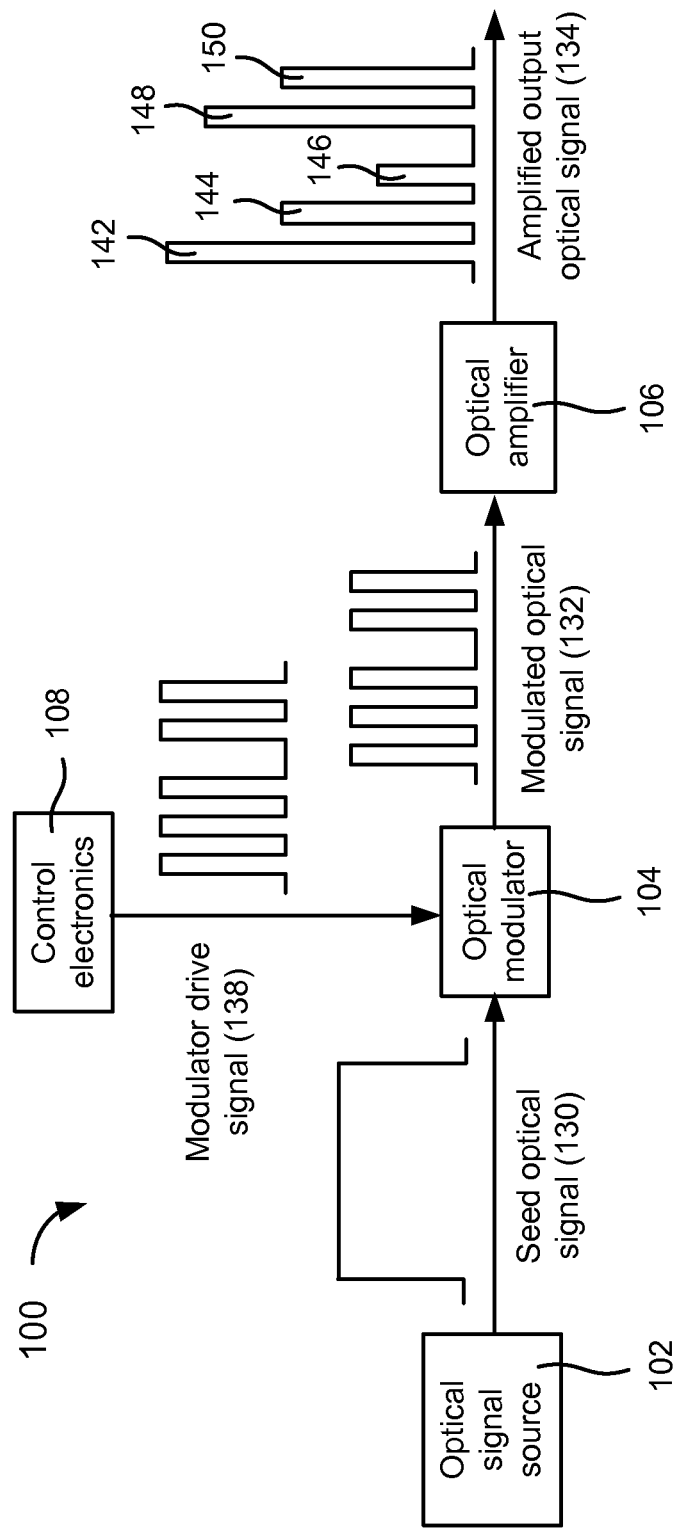
FIG. 1 is a simplified block diagram illustrating performance of a conventional optical amplifier system.

The present invention relates generally to the field of optical amplifiers and lasers. More specifically, the present invention relates to methods and systems for providing gain-compensated laser pulses useful for industrial applications such as ablating, trimming, marking, cutting, and welding. Merely by way of example, the invention has been applied to a laser source with real-time tunable characteristics including pulse width, peak power, repetition rate, and temporal pulse shape. However, the present invention has broader applicability and can be applied to other laser sources and amplifier systems.

Without limiting embodiments of the present invention, the term laser "pulse" as described herein comprises a laser signal having a short or very short duration, typically lasting (but not limited to) a small fraction of a second. However, within that short duration, the instantaneous power of the laser will be understood to typically vary with time, from a low or zero level before the onset of the pulse, to a high level during the pulse itself, and back to a low or zero level after the pulse has completed. The specific variation of instantaneous laser power over time within the duration of the pulse, is a key parameter in differentiating the properties of different pulses, one from the other. The term "pulse profile" used herein describes this variation of instantaneous intensity over time during the duration of the pulse. It is also used to describe the variation over time of various related signals, such as electrical control signals, or detected feedback signals.

In fiber-based or rod-based optical amplifiers, shape deformation of the optical pulse occurs when the output pulse energy approaches the stored energy within the amplifier. In the steady state regime it is the signal intensity that is responsible for gain saturation effects, whereas for the dynamic regime it is the energy density. The main consequence is that a high power pulse is distorted as it propagates through the gain medium. As the pulse passes through the fiber amplifier, it extracts progressively more energy from the fiber, reducing the available gain as it does so. It is this progressively reducing gain which causes the pulse deformation. Description of a fiber amplifier system configured to emit shaped optical waveform is provided in commonly assigned U.S. Pat. No. 7,742,511, the specification of which is hereby incorporated by reference for all purposes. It should be noted that the methods and systems utilized in U.S. Pat. No. 7,742,511 can be implemented in conjunction with the methods and systems described herein. In one example, U.S. Pat. No. 7,742,511 describes how the gain saturation in the amplifier may be counter-balanced to generate a substantially square output pulse by generating a driving signal for a modulator that has a lower rising edge than falling edge. In other examples, U.S. Pat. No. 7,742,511 describes how to tailor the driving signal to produce any desired output temporal pulse profiles, such as a pulse profile with a significant leading edge overshoot or a pulse profile with one or two mid-pulse spikes.

In addition to causing pulse deformation in the duration of a single pulse, gain saturation may also cause power variations among pulses in a pulse train depending on pulse repetition rate. FIG. 1 is a simplified block diagram illustrating operation of a conventional optical amplifier system 100. The optical amplifier system 100 includes an optical signal source 102, an optical modulator 104, an optical amplifier 106, and control electronics 108. The optical signal source 102 provides a seed optical signal 130. The optical modulator 104 has a first input coupled to the optical signal source 102, a second input coupled to the control electronics 108, and an output. The control electronics 108 provides a modulator drive signal 138 to the optical modulator 104. The optical modulator 104 modulates the amplitude of the seed optical signal 130 to provide a modulated optical signal 132. The seed optical signal 130 may be a continuous wave (CW) optical signal or a pulsed signal. In the case where the seed optical signal 130 is a CW optical signal, the optical modulator 104 can transform the CW seed optical signal 130 into a pulsed optical signal comprising a plurality of pulses. The modulated optical signal 132 is coupled to the input of the optical amplifier 106. An input optical pulse train 132 is amplified by the optical amplifier 106 to become an amplified output optical pulse train 134.

The optical amplifier 106 includes a rare-earth doped fiber gain medium. In the illustrative example shown in FIG. 1, the pulses of the input pulse train 132 have substantially the same amplitude, and the pulses of the amplified output pulse train 134 are characterized by differing amplitudes depending on the position of the pulses in the pulse sequence. The first pulse 142 in the sequence generally experiences more gain during amplification than the second and third pulses 144 and 146 because the first pulse extracts a significant fraction of the energy from the gain medium, which is not yet replenished by the time the second and third pulses 144 and 146 pass through the gain medium. The fourth pulse 148 experiences more gain than the second and third pulses because the time delay between the fourth pulse 148 and the third pulse 146 is long enough for the gain to recover to a substantial degree. The fifth pulse 150 experiences less gain compared to the fourth pulse, and so on. The variability of energy per pulse between various pulses in a sequence is undesirable.

Figure 2:
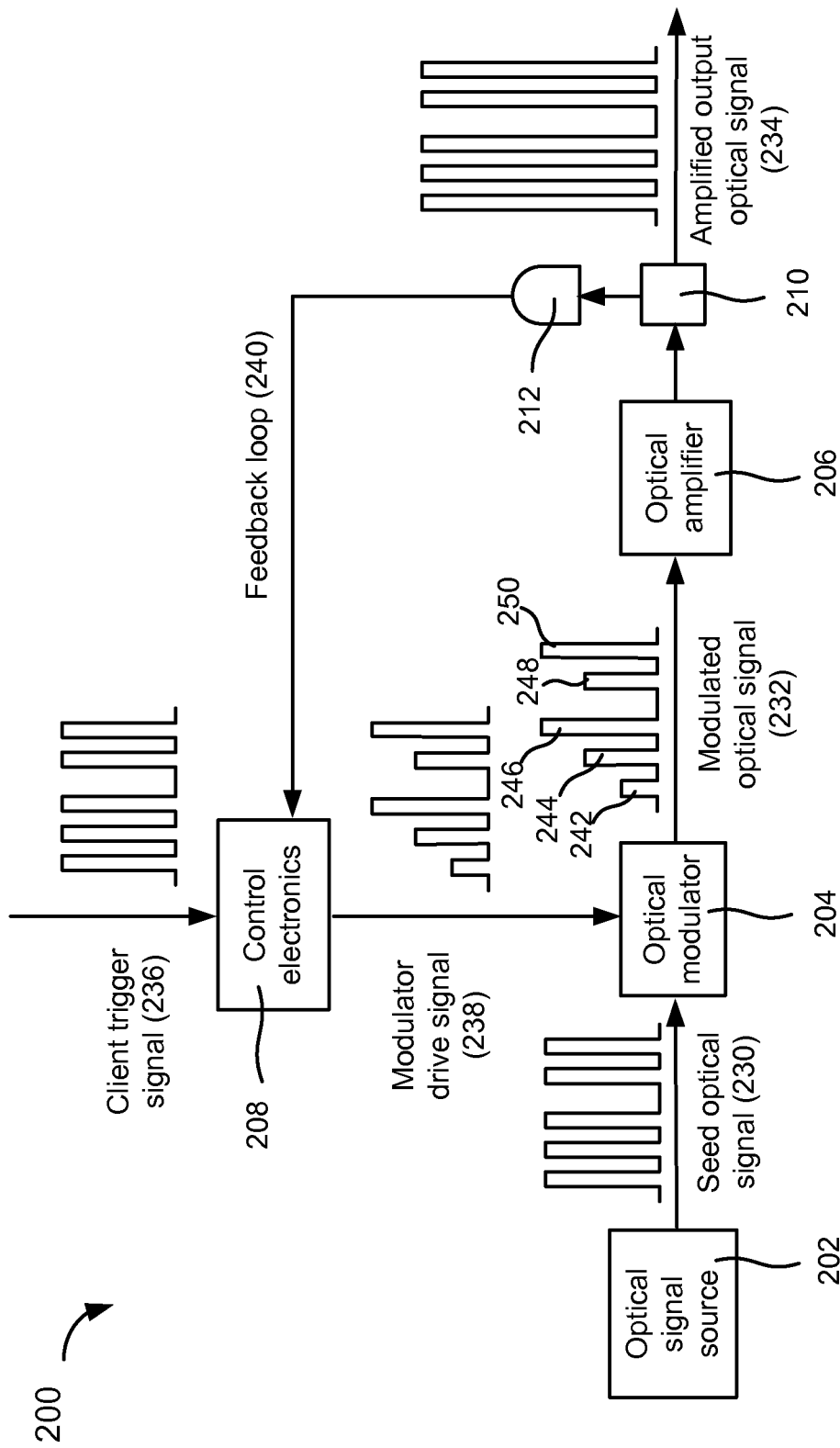
FIG. 2 is a simplified block diagram illustrating operation of an optical amplifier system according to an embodiment of the present invention.

FIG. 2 is a simplified block diagram illustrating operation of an optical amplifier system 200 according to an embodiment of the present invention. As discussed in relation to FIG. 2, embodiments of the present invention implement dynamic compensation for the gain variation by providing a pre-compensated input optical signal to the optical amplifier. The optical system 200 includes an optical signal source 202 that provides a seed optical signal 230, an optical modulator 204, an optical amplifier 206, and control electronics 208. The optical signal source can be a laser, a laser/amplifier combination, or the like. In some embodiments, the optical signal source 202 is a semiconductor laser (e.g., CW fiber Bragg grating (FBG) stabilized semiconductor diode laser operating at a wavelength of 1032 nm with an output power of 20 mW). In another particular embodiment, the optical signal source is an external cavity semiconductor diode laser operating at a wavelength of 1064 nm with an output power of 100 mW. In alternative embodiments, the optical signal source includes a compact solid-state laser or a fiber laser. Other laser sources, LED sources, or the like can be utilized depending on the particular application. Thus, the seed optical signal 230 can be a CW signal or a pulsed signal depending on the particular embodiment. In embodiments in which a CW signal is used, pulses can be formed after passing through the optical modulator 204. One of ordinary skill in the art would recognize many variations, modifications, and alternatives.

In a particular embodiment, the optical modulator 204 is an optical amplitude modulator such as an APE-type Lithium Niobate Mach-Zehnder modulator having a bandwidth >3 GHz at 1064 nm. According to other embodiments of the present invention, the optical modulator 204 is an electro-optic Mach-Zehnder type modulator, which provides the bandwidth necessary for generating short optical pulses. In other embodiments, the optical modulator 204 is a phase or frequency modulator with a suitable phase or frequency to amplitude converter, such as an edge optical filter, an extinction modulator, or an acousto-optic modulator.

According to an embodiment of the present invention, the optical amplifier 206 is an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium (for amplification of light in wavelength range between 980 nm and 1100 nm), Erbium, Holmium, Praseodymium, Thulium, or Neodymium for amplification at other wavelengths. In a particular embodiment, all of the fiber-optic based components utilized in constructing optical amplifier 150 utilize polarization-maintaining single-mode fiber. In alternative embodiments, the optical amplifier 206 is a solid-state rod amplifier or a solid-state disk amplifier. According to an embodiment, the optical amplifier 206 comprises gaseous gain media. According to various embodiments, the optical amplifier 206 comprises a single-stage optical amplifier or a multiple-stage optical amplifier.

Along with the amplified output optical pulse train 234 at the signal wavelength, amplified spontaneous emission (ASE) can exist, co-propagating over a range of wavelengths which may include the signal wavelength. ASE may also exist at the input end of the amplifier, counter-propagating with respect to the input optical pulse train 232. The ASE signal is directly related to the amount of gain in the amplifier's gain medium. Therefore it is possible to dynamically compensate for the gain variation between pulses by monitoring either the forward-propagating or the reverse-propagating ASE signal. Additional description of a fiber amplifier system configured to utilize either the forward-propagating or the reverse-propagating ASE signal as a feedback signal to control the pump signal is provided in commonly assigned U.S. Pat. No. 7,667,889, the specification of which is hereby incorporated by reference for all purposes. It should be noted that the methods and systems utilized in U.S. Pat. No. 7,667,889 can be implemented in conjunction with the methods and systems described herein.

Referring once again to FIG. 2, the optical amplifier system 200 includes a feedback loop 240 between the output of the optical amplifier 206 and the control electronics 208. As discussed above, the feedback loop 240 detects a feedback signal (e.g., ASE) related to the gain of the amplifier. According to an embodiment, a forward-propagating ASE signal at a first wavelength is separated from the signal at the signal wavelength using a signal separator 210. The signal separator 210 can be a wavelength demultiplexer. The wavelength demultiplexer can be an all-fiber wavelength demultiplexer, a dichroic mirror, a grating, a prism, or other suitable wavelength demultiplexers. According to another embodiment, a reverse-propagating ASE signal is detected at the input end of the optical amplifier 206 using an optical circulator (not shown in FIG. 2). According to various embodiments, an ASE detector may detect all of the ASE signal or only a portion of the ASE signal.

The forward-propagating ASE signal and the reverse propagating ASE signal are directly related to the gain of the optical amplifier 206, and therefore, can serve as the feedback signal for gain compensation. In either embodiment, the forward-propagating or the reverse-propagating ASE signal impinges on one or more photodetector(s) 212 to generate an electrical feedback signal, which is fed into the control electronics 208. It should be noted that the photodetector(s) 212 can include multiple photodetectors detecting differing wavelengths, one or more photodetectors detecting light over a range of wavelengths, or the like. As an example, the ASE is usually present at wavelengths differing from the wavelength of the optical signal source. In this example, the ASE at wavelengths outside the bandwidth of the optical signal source could be used to generate the feedback signal. Alternatively, a detector could detect the ASE over a narrow band using a filter (e.g., around 1030 nm) for an optical signal at 1064 nm. Multiple bands for ASE detection can also be utilized. In yet another alternative embodiment, the ASE signals at substantially all wavelengths other than the signal wavelength could be used to generate the ASE signal. Although not illustrated in FIG. 2, one or more photodetectors can be used to detect ASE propagating in the reverse direction from the optical amplifier toward the optical modulator 204. One of ordinary skill in the art would recognize many variations, modifications, and alternatives.

The control electronics generate a modulator drive signal 238 based on the electrical feedback signal, such that optical modulator 204 outputs a modulated optical signal 232 that is pre-compensated for the gain variation of the optical amplifier 206. In the illustrative example shown in FIG. 2, the first pulse 242, the second pulse 244, and the fourth pulse 248 in the sequence are proportionally attenuated such that the plurality of pulses in the amplified output optical signal 234 has a substantially uniform pulse-to-pulse amplitude. A fiber-based optical amplifier provided by an embodiment is particularly well suited for the amplification of optical pulses with constant pulse-to-pulse characteristics, thereby providing for uniform pulse-to-pulse amplitude for the amplified output optical signal 234. Additionally, in applications requiring variable pulse repetition rate, pulse-to-pulse energy, and the like, embodiments of the present invention are suitable.

As illustrated in FIG. 2, the feedback signal is provided to the control electronics to pre-compensate the drive signal provided to the optical modulator, and the output of the optical modulator as a result. Thus, the output of the optical modulator is a pre-distorted or pre-compensated optical signal that, when it is amplified by the optical amplifier(s) (for example, one, two, three, or more optical amplifiers), the output signal has a desired amplitude profile (for instance a substantially uniform amplitude profile). Embodiments of the present invention provide a system that uses feed forward and feedback control based on the inputs signals provided to the optical amplifier and the state of the optical amplifier, particularly the gain.

As an example, using the ASE feedback signal, the ASE is measured and fed to the control electronics before the pulse enters the amplifier. Based on the ASE feedback signal, the control electronics provides an electrical input signal to the amplitude modulator such that the optical input signal to the amplifier(s) is appropriate to achieve the desired output pulse profile. The monitoring of the ASE is performed at a rate sufficient in some embodiments to provide predetermined electrical input signals to the amplitude modulator for each pulse in the pulse train. In an exemplary implementation, if a large number of pulses are received in a short period of time, progressively depressing the gain, the ASE level will decrease and the control electronics would accordingly produce a modulator drive signal that would lead to a larger modulated optical signal, requiring less amplification to produce uniform output pulses.

According to an alternative embodiment, the optical amplifier system 200 utilizes a client trigger signal 236 as an input to the gain compensation system. The client trigger signal can be used in conjunction with the ASE feedback signal or as an alternative to the ASE feedback signal. The control electronics 208 receives the client trigger signal 236, which includes a plurality pulses with a particular sequence. The control electronics 208 determines a gain of the optical amplifier 206 for each pulse according to the position of the respective pulse in the sequence and generates a modulator drive signal 238 accordingly. For example, if the laser is initially operating at 100 kHz according to the client trigger signal, and then the client trigger signal changes to operate the laser at 50 kHz, this would typically result in additional gain compared to operation at 100 kHz. The detected change in repetition rate can be used to modify the modulator drive signal 238 as appropriate to the changes in the amplifier gain resulting from the variation in the repetition rate detected in the client trigger signal. Thus, embodiments of the present invention use the client trigger signal, which provides information on the timing of the trigger pulses, to calculate the compensation signal that will generate the modulated input signal and the desired amplified output signal.

According to embodiments of the present invention, methods and systems are provided that result in the generation of sequences of optical pulses, which may not be equally separated in time. Moreover, the pulse widths and pulse energies may be individually tailored in a predetermined manner from pulse to pulse. Furthermore, the pulses may include an arbitrary train of optical pulse sequences. Thus, although pulses with substantially uniform amplitude are illustrated in FIG. 2, this is not required by the present invention and other embodiments utilize gain compensation to provide pulses with predetermined output amplitudes, pulse widths, pulse-to-pulse delay, repetition rates, or the like. One of ordinary skill in the art would recognize many variations, modifications, and alternatives.

In some embodiments, the client trigger signal includes information on the time interval between different pulses, which can be used to compute the impact on the gain resulting from amplification of the pulses. Alternatively, or in combination with the timing information, the client trigger signal can include information related to a history of previous pulses, for example, the pulse history over the previous millisecond, which can be used to compute the impact on the gain from the historical pulses and compensate for these impacts. Variations among a plurality of amplifiers can be accounted for during the gain analysis process, with baseline values associated with each unique amplifier.

Using either or both feedback signals (including information related to the amplifier gain or client trigger signal information) which can be used to compute the amplifier gain, embodiments of the present invention provide methods and systems for modulating the input optical signal delivered to the amplifier, with a predetermined modulation profile for the input resulting, after amplification, in a desired output optical signal profile.

Figure 3:
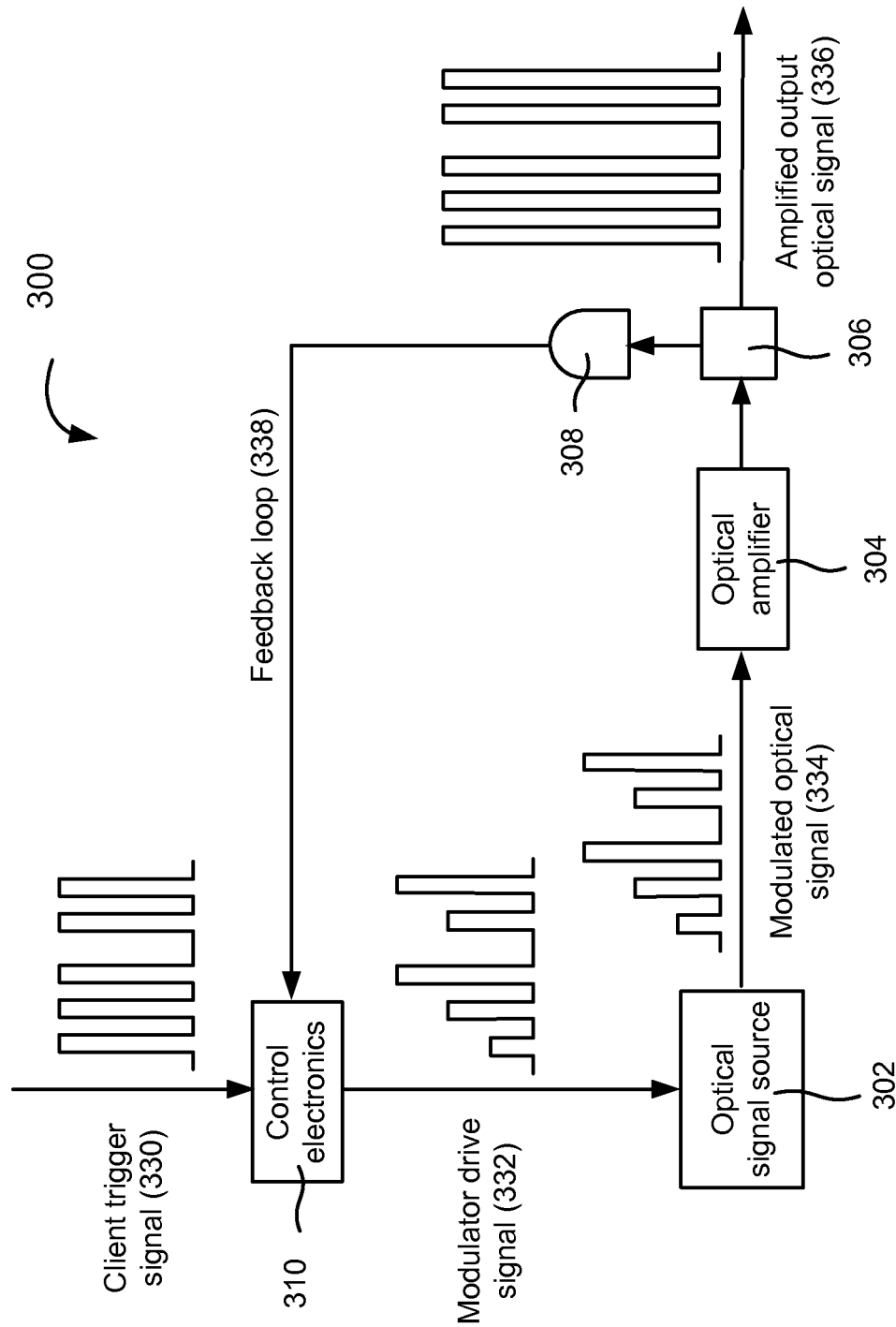
FIG. 3 is a simplified block diagram illustrating operation of an optical amplifier system according to another embodiment of the present invention.

FIG. 3 is a simplified block diagram illustrating operation of an optical amplifier system 300 according to another embodiment of the present invention. The optical amplifier system 300 includes an optical signal source 302, an optical amplifier 304, and control electronics 310. The optical amplifier 304 includes a rare-earth doped fiber gain medium. According to an embodiment, the optical system 300 also includes a feedback loop 338. The feedback loop 338 detects a feedback signal related to a gain of the optical amplifier 304. According to an embodiment, a forward-propagating ASE signal at a first wavelength is separated from the signal at the signal wavelength using a signal separator 306. The signal separator 306 can be a wavelength demultiplexer. The wavelength demultiplexer can be an all-fiber wavelength demultiplexer, a dichroic mirror, a grating, a prism, or other suitable wavelength demultiplexer. According to another embodiment, a reverse-propagating ASE signal is detected at the input end of the optical amplifier 304 using an optical circulator (not shown in FIG. 3). In either embodiment, the forward-propagating or the reverse-propagating ASE signal impinges on one or more photodetector(s) 308 to generate an electrical feedback signal. The electrical feedback signal from the photodetector 308 is input into the control electronics 310, which generates a modulator drive signal 332 accordingly to the electrical feedback signal. In some embodiments in which reverse-propagating ASE is utilized to generate a feedback signal, the separation of ASE from the signal at the signal wavelength may be simplified because the power present in the reverse-propagating signal at the signal wavelength can be negligible.

According to an alternative embodiment, the optical system 300 utilizes a client trigger signal 330 for providing gain compensation in a similar manner as described above in reference to FIG. 2. The modulator drive signal 332 is used to control the optical signal source 302, which produces a pre-compensated input optical pulse train 334 such that the amplified output optical pulse train 336 is substantially uniform from pulse to pulse independent of the pulse sequence. According to an embodiment, the optical signal source 302 is a laser diode powered by an electric current that is controlled by the modulator drive signal 332.

Referring to FIG. 3, the optical signal source that provides the modulated optical signal can be compared to the optical signal source 202 and the optical modulator 204 illustrated in FIG. 2. Rather than providing the modulator drive signal to the optical modulator 204, the embodiment illustrated in FIG. 3 provides the modulator drive signal 332 to the optical signal source, providing an embodiment in which the number of system components can be reduced. As an example, the optical signal source 302 can be a semiconductor laser, directly modulated using the modulator drive signal 332. Other lasers suitable for modulation can be used as an optical signal source 302. Thus, embodiments of the present invention can utilize optical modulators in conjunction with optical signal sources or use directly controlled optical signal sources. Although not shown in FIG. 3, additional preamplifier modules can be utilized to amplify the modulated optical signal 334 prior to amplification in optical amplifier 304, which can include multiple amplifier modules. Moreover, although a uniform amplitude for the amplified output optical signal 336 is illustrated in FIG. 3, this is not required by embodiments of the present invention and other predetermined pulse profiles, delay between pulses, and the like can be provided by embodiments. Merely by way of example, an exemplary temporal pulse profile is illustrated in FIG. 7C in which a first pulse shape with three stair-step subportions is followed by a substantially top-hat shape portion after a predetermined delay time. One of ordinary skill in the art would recognize many variations, modifications, and alternatives.

Figure 4:
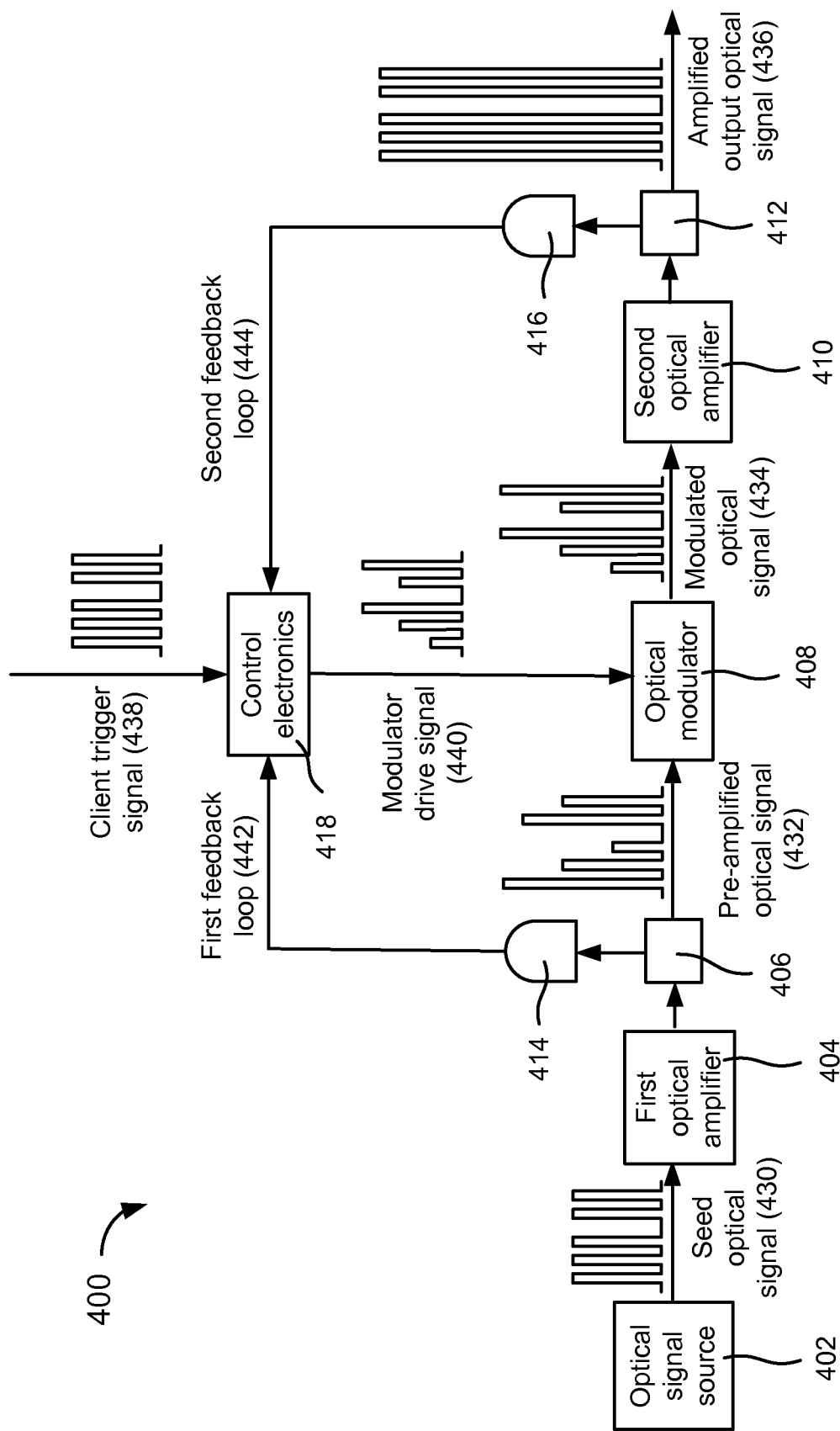
FIG. 4 is a simplified block diagram illustrating operation of an optical amplifier system according to yet another embodiment of the present invention.

FIG. 4 is a simplified block diagram illustrating operation of an optical amplifier system according to yet another embodiment of the present invention. The optical amplifier system 400 includes an optical signal source 402, a first optical amplifier 404 (which can include multiple amplifier modules and can also be referred to as pre-amplifier(s)), an optical modulator 408, a second optical amplifier 410 (which can include multiple amplifier modules), and control electronics 418. As with the system illustrated in FIG. 3, the system illustrated in FIG. 4 can share common components with the system illustrated in FIG. 2. The optical signal source 402 produces a seed optical signal 430, which is pre-amplified by the first optical amplifier 404. The pre-amplified optical signal 432 is modulated by the optical modulator 408 to become a modulated optical signal 434. Although portions of the modulated optical signal appear to have experienced gain while passing through the optical modulator, it will be appreciated that the variations in pulse amplitude are merely provided to illustrate the effects of gain depression or increases on the pulses during amplification and modulation of temporal and/or amplitude in order to provide a modulated optical signal 434 with a predetermined profile. The modulated optical signal 434 is amplified by the second optical amplifier 410 to become an amplified output optical pulse train 436 that is characterized by substantially uniform pulse-to-pulse amplitude independent of the pulse sequence, particularly the time delay between pulses.

According to an embodiment of the present invention, the optical system 400 also includes a first feedback loop 442 and a second feedback loop 444, which detect a first feedback signal related to a gain of the first optical amplifier 404 and a second feedback signal related to a gain of the second optical amplifier 410, respectively. The first and second feedback signals are input into the control electronics 418, which provides a modulator drive signal 440 based on the first and second feedback signals such that the gain variations in both the first and second optical amplifiers are pre-compensated in the modulated optical signal 434. According to an embodiment, a forward-propagating ASE signal at a first wavelength at the output of the first optical amplifier 404 is separated from the signal at the signal wavelength using a first signal separator 406. The separated ASE signal impinges on a first photodetector 414 to produce the first electrical feedback signal. Likewise, a forward-propagating ASE signal at a second wavelength at the output of the second optical amplifier 410 is separated from the signal at the signal wavelength using a second signal separator 412. The separated ASE signal impinges on a second photodetector 416 to produce the second electrical feedback signal. According to an embodiment, each of the first and second signal separators 406 and 412 can be a wavelength demultiplexer. The wavelength demultiplexer can be an all-fiber wavelength demultiplexer, a dichroic mirror, a grating, a prism, or other suitable wavelength demultiplexers. According to other embodiments, either or both of first and second feedback signals are produced from reverse-propagating ASE signals detected at the input ends of the first and second optical amplifiers 404 and 410. According to an alternative embodiment, the optical system 400 utilizes a client trigger signal 438 for providing gain compensation in a similar manner as described above in reference to FIG. 2.

As illustrated in FIG. 4, the seed optical signal is amplified by one or more first amplifiers (e.g., a group of pre-amplifiers)

and amplified (e.g., in a set of amplifier modules) after passing through the optical modulator 408. The first amplification process results in some distortion of the signal as later pulses in each set have a smaller amplitude than earlier pulses in the set as a result of gain depression. The feedback signal in first feedback loop 442 provides information on the gain in the first optical amplifier 404 and the feedback signal in second feedback loop 444 provides information on the gain in the second optical amplifier 410. This feedback information is used by the control electronics to drive the optical modulator 408 and generate a predetermined input to the second optical amplifier 410. The modulator drive signal 440 thus compensates for the distortion introduced during the first amplification process (e.g., pre-amplifiers) as well as pre-compensating for the distortion that will occur in the second power amplifier 410.

Figure 5:
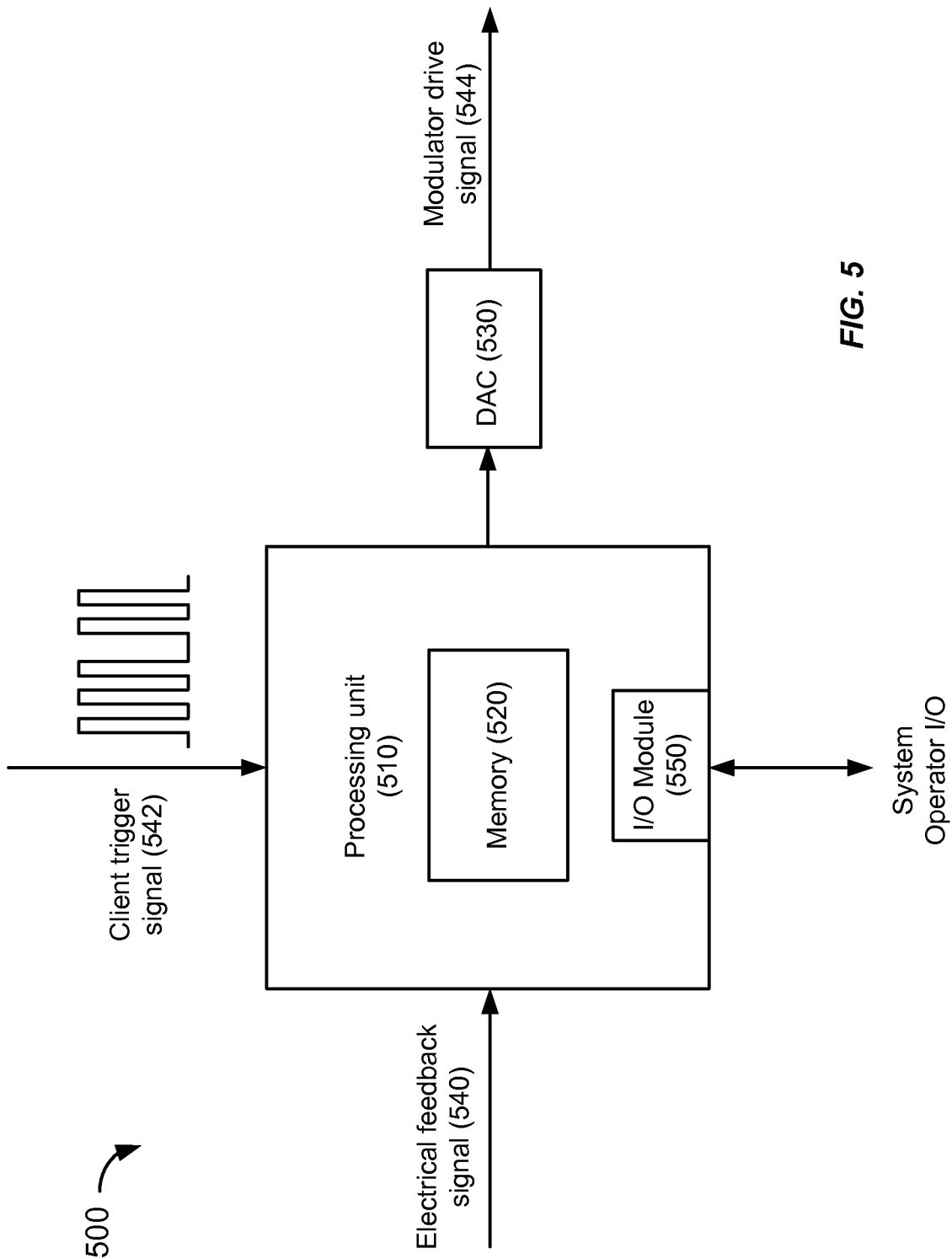
FIG. 5 is a simplified block diagram illustrating a control system for a laser/amplifier system according to an embodiment of the present invention.

FIG. 5 is a simplified block diagram illustrating a control system 500 for a laser/amplifier system according to an embodiment of the present invention. The control system 500 includes a processing unit 510, a memory 520, and a digital-to-analog converter (DAC) 530. According to an embodiment, a plurality of modulator drive signal pulse profiles for a given target pulse profile are pre-calculated for various pulse repetition rates in a given frequency range. The pre-calculated pulse profiles are then stored in the memory 520. As an illustrative example, 16 pulse profiles may be pre-calculated for the modulator drive signal for 16 different repetition rates in the frequency range from 10 Hz to 500 kHz. Each pre-calculated pulse profile takes into consideration the gain variation between pulses associated with a respective repetition rate. The 16 different repetition rates may be equally spaced or unequally spaced. According to an embodiment, the 16 different repetition rates are more densely spaced in the 10 Hz to 100 kHz range than in the 100 kHz to 500 kHz range, since the gain variation between pulses may be more pronounced in the 10 Hz to 100 kHz range. In other embodiments, other frequency ranges are utilized. In real-time operation of the optical amplifier, the control system 500 selects one of the plurality of stored pulse profiles for each pulse in the pulse train depending on the electrical feedback signal 540, the client trigger signal 542, combinations thereof, or the like. Although 16 pulse profiles are stored in some embodiments, this is not required by the present invention and a greater number or a lesser number of pulse profiles can be stored depending on the particular application. As an example, 32 signals or 64 signals can be stored in order to provide finer steps or a broader frequency range. One of ordinary skill in the art would recognize many variations, modifications, and alternatives. In a specific embodiment, the stored pulse profiles can be associated with information related to the client trigger signal (e.g., a delay between pulses), the feedback signal related to the gain, combinations thereof, or the like. Depending on the desired output pulse profile, the trigger client signal, and/or the feedback signal associated with the gain of the one or more amplifiers, a stored pulse profile can be selected by the processing unit 510 to provide the desired modulator drive signal 544.

According to embodiments of the present invention, the drive signal applied to the optical amplitude modulator has a shaped waveform originating from a digital pattern converted into an analog signal using a high speed DAC. Using a computer, shaped waveforms are generated by creating a digital representation of the waveform in the memory on-board the DAC. This digital pattern is then converted into an analog signal using a high speed DAC. Preferably the DAC's output rise and fall times are less than 1 ns, more preferably less than 500 picoseconds (ps), most preferably less than 300 ps. Preferably the DAC is configured to generate a pre-programmed waveform loaded into memory using a computer every time a trigger event occurs. Preferably the sampling rate of the DAC is at least 500 megasample/s (MS/s), more preferably it is at least 1 gigasample/second (GS/S), most preferably it is at least 2 GS/s. With such a sampling rate, the digital pattern can be defined every 2 nanosecond (ns) or better. With 1 GS/s sampling rate, this means that arbitrary waveform can be generated with 1 ns resolution. Preferably the DAC has an analog electrical bandwidth larger than 100 MHz, more preferably the analog bandwidth is larger than 300 MHz, and most preferably it is larger than 1 GHz. Preferably the voltage resolution of the DAC is 8 bits, more preferably it is 10 bits, most preferably it is 12 bits or better.

In an embodiment responsive to the gain based on the ASE feedback signal, the control system 500 receives an electrical feedback signal 540. Under the control of the processor 510, the control system 500 selects a pulse profile from the plurality of pulse profiles stored in the memory 520 according to the received electric feedback signal 540. The DAC 530 outputs a modulator drive signal 544 according to the selected pulse profile. According to an embodiment, the modulator drive signal 544 is provided to the modulator 204 shown in FIG. 2. According to an alternative embodiment, the modulator drive signal 544 is provided to the optical signal source 302 shown in FIG. 3.

According to an alternative embodiment, the control system 500 receives a client trigger signal 542 that includes a plurality of pulses with a particular pulse sequence. The control system 500 determines a gain of an amplifier for each pulse according to a position of the pulse in the pulse sequence. Under the control of the processor, the control system 500 then selects a pulse profile from the plurality of pulse profiles stored in the memory 520 based on the determined gain. According to embodiments of the present invention, the processor 510 can be any type of processor such as a microprocessor, field programmable gate array (FPGA), and/or application specific integrated circuit (ASIC). The memory 520 can be any type of memory, such as a ROM or RAM memory.

According to an embodiment, the As an example, a system operator could specify a desired output pulse profile using the I/O module 550, for example, a 20 ns wide pulse with a sawtooth amplitude profile or a 50 ns wide pulse with a chair shape. The memory 520 in this example will include a plurality of stored pulse profiles that have been pre-calculated and that, given certain conditions for the optical amplifier and/or the client trigger signal, will generate a modulator drive signal that will, in turn, generate the desired output pulse profile. Thus, for various conditions of the gain medium, the processing unit will select the proper stored pulse profile to generate the desired output pulse profile. In some embodiments, memory 520 includes a set of memories, with each memory being associated with one desired output pulse shape. In these embodiments, a system operator could select one of the desired output pulse shapes from the set using the I/O module and entries in the particular memory would be used in generating the appropriate modulator drive signal. It should be noted that in some embodiments, a multi-dimensional memory for which a pulse profile in memory is selected using multiple inputs, for example, the client trigger signal and the ASE feedback signal.

Although some embodiments are discussed in terms of a set of pulse profiles stored in memory and useful in generating a predetermined optical pulse profile, this is not required by the present invention and other embodiments can modify the pulse shapes as the laser is operating. As an example, a first portion of the memory can be utilized in producing a first predetermined pulse profile. Calculations could be performed to compute a second set of pulse shapes associated with a second set of optical pulse profiles. This second set of pulse shapes could then be stored in a second portion of the memory and subsequently utilized in producing the second predetermined pulse profile after operation using the first predetermined pulse profile is completed. Thus, embodiments of the present invention provide for an oscillating or a circulating set of pulse shapes that can be used to perform laser processing applications. In some embodiments, an operator can provide a desired output pulse profile using the I/O module and the processor could compute, in real time in some embodiments, the set of pulse profiles suitable for use in generating the desired output pulse profile. Thus, embodiments provide an optical amplifier system that can modify the output pulse profile in response to the operator inputs, which may be provided by a computer or other suitable system.

Figure 6:
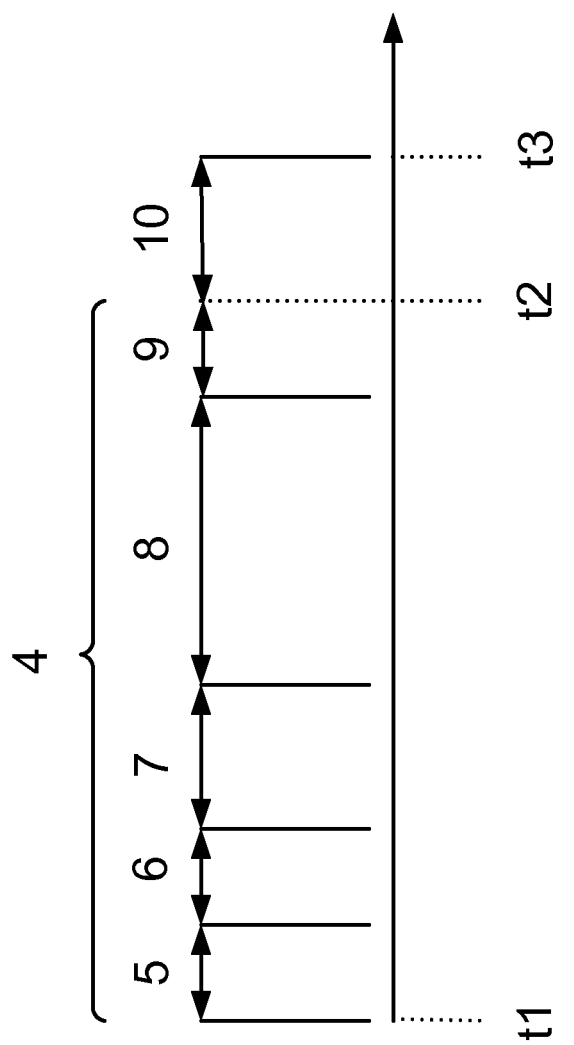
FIG. 6 illustrates an exemplary trigger sequence used for a laser/amplifier system according to an embodiment of the present invention.

FIG. 6 illustrates an exemplary client trigger pulse sequence used for a laser/amplifier system according to an embodiment of the present invention. Each vertical bar represents a trigger pulse. The trigger information is analyzed in a time frame 4 that begins at t1 and ends at t2. 5, 6, 7, 8, and 9 represent time intervals between adjacent trigger pulses. 10 represents the time delay before the next incoming trigger pulse. From the past trigger information, a gain compression factor can be derived using many different analytical and computational techniques. According to an embodiment, an approximation for the compression factor is derived from the following equation:

$$\alpha \propto \int_{t_1}^{t_2} \sum_i a_i * \delta(t - \tau_i) * E_{pulse} * dt,$$

where $\alpha$ is the gain compression factor and represents the instantaneous value of the amplifier's gain coefficient expressed as a fraction of its maximum value, $a_i$ is a weight associated with each trigger pulse, $\tau_i$ represents a trigger time marker, $E_{pulse}$ is the pulse energy, and $\delta(x)$ is a delta function having a value of infinity when x=0 and zero when x≠0, constrained by the identity that the integral of the delta function over all values is one. The gain compression factor is computed in some embodiments according to the above equation over a sliding time window from t1 to t2. The computed gain compression factor is then used to compute a pulse profile for the modulator drive signal.

Figure 7A:
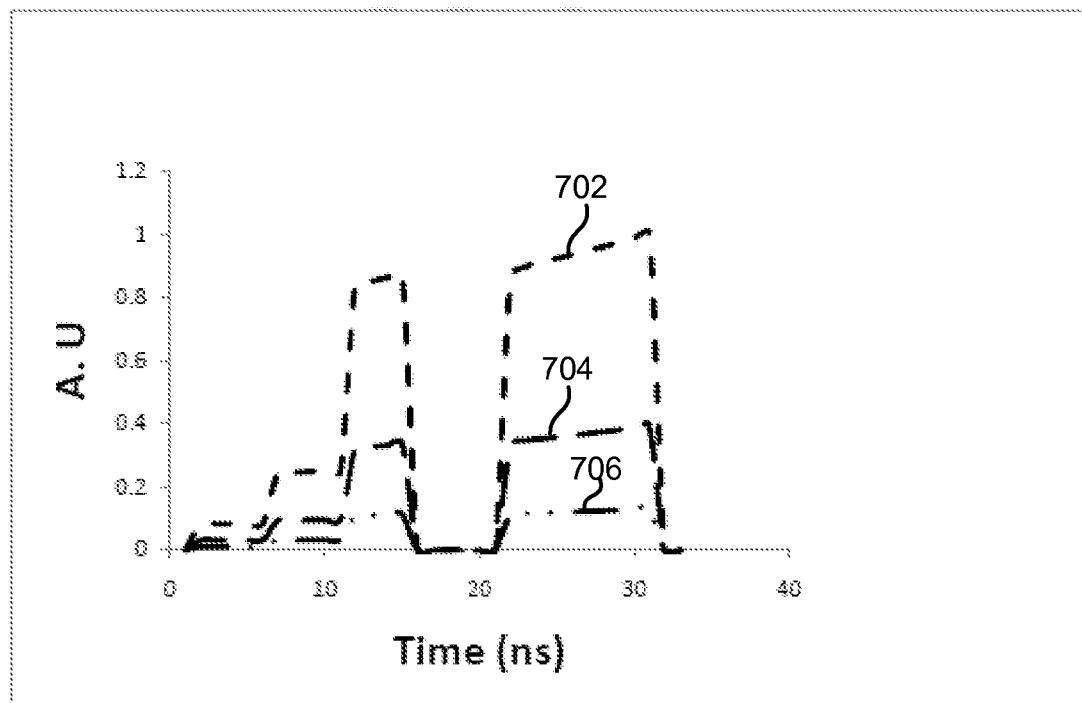
FIG. 7A illustrates exemplary pulse profiles of a modulator drive signal according to an embodiment of the present invention.
Figure 7B:
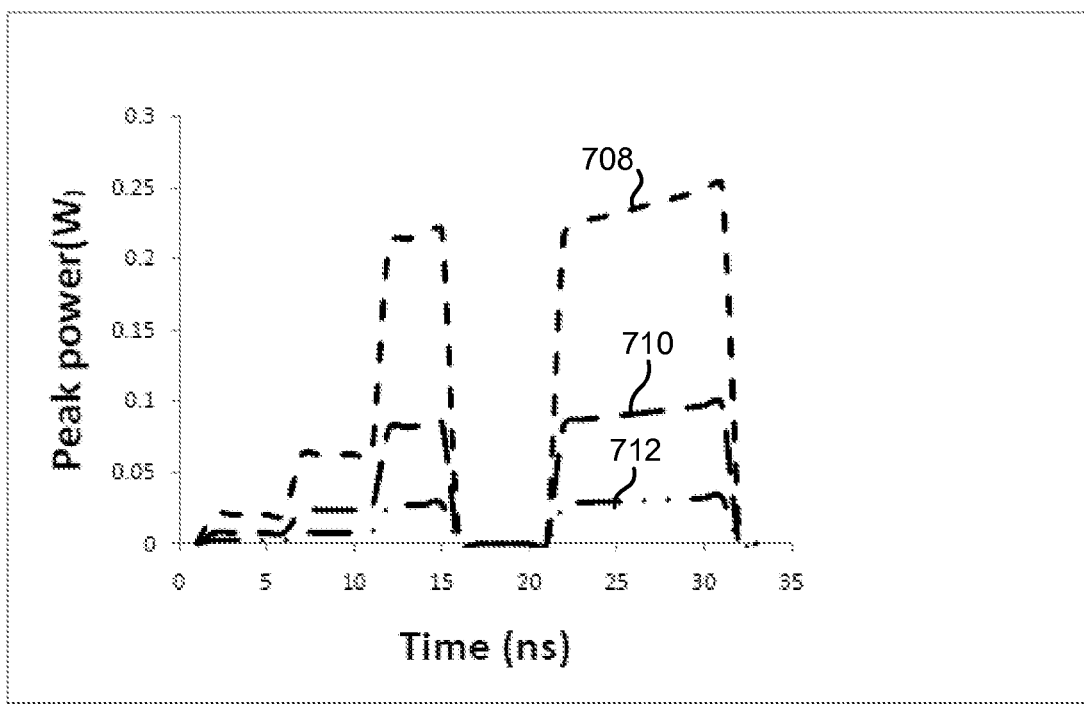
FIG. 7B illustrates exemplary pulse profiles of a modulated optical input signal according to an embodiment of the present invention.
Figure 7C:
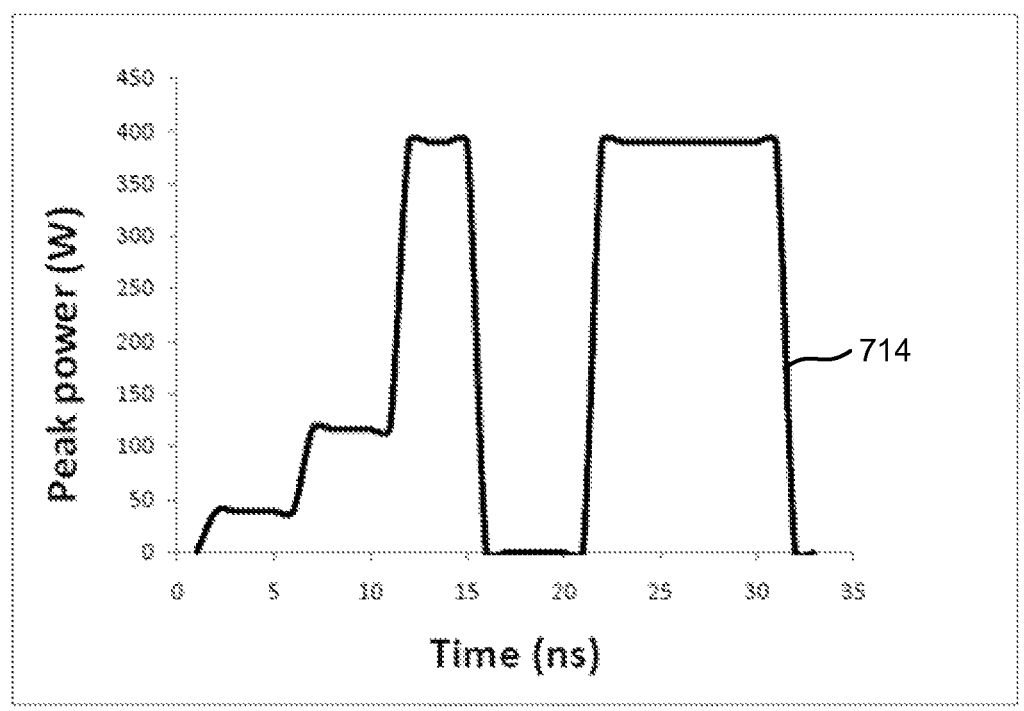
FIG. 7C shows an exemplary pulse profile of a target output optical signal according to an embodiment of the present invention.

FIG. 7 illustrates exemplary pulse profiles according to an embodiment of the present invention. FIG. 7C shows an exemplary target optical pulse profile 714 for the amplified output optical signal according to an embodiment of the present invention. FIG. 7B illustrates exemplary pulse profiles for a modulated optical input signal required to generate exemplary target optical pulse profile 714 according to an embodiment of the present invention. In this example, pulse profiles 708, 710, and 712 represent input optical pulse profiles calculated to generate exemplary optical pulse profile 714 pulse at repetition rates of about 200 kHz, 100 kHz, and 30 kHz, respectively. FIG. 7A illustrates exemplary pulse profiles for a modulator drive signal required to generate a modulated optical input signal which in turn will produce exemplary target optical pulse profile 714 according to an embodiment of the present invention. The pulse profiles 702, 704, and 706 represent the modulator drive signals required to generate exemplary optical pulse profile 714 for pulse repetition rates of about 200 kHz, 100 kHz, and 30 kHz, respectively.

As illustrated in FIG. 7A, the modulator drive signal has different electrical pulse amplitudes and waveforms for different pulse repetition rates, which results in a modulated optical signal that also has different optical pulse amplitudes for different pulse repetition rates as shown in FIG. 7B. It will be appreciated that differences between the electrical input signal shown in FIG. 7A and the optical signal shown in FIG. 7B result from the transfer function associated with the optical modulator. If the modulator drive signal waveforms are chosen correctly, the pulse profile 714 of the amplified output optical signal will be substantially independent of pulse repetition rate. Furthermore, the pulse profile 714 of the amplified output optical signal is characterized by a flat-top or plateau waveform for each subportion of the pulse profile, as compared to the slanted waveforms associated with the electrical modulator drive signal 702, 704, and 706 shown in FIG. 7A, and of the modulated optical signal 708, 710, and 712 shown in FIG. 7B. The slanted waveform with a lower rising edge than falling edge compensates for the pulse shape deformation caused by gain saturation, as described in commonly assigned U.S. Pat. No. 7,742,511.

As shown in FIGS. 7A-7C, the modulated optical signal 708 includes a gradually rising amplitude between ~20 ns and 32 ns, whereas the output optical signal 714 has a flat top profile as a result of the roll-off of the gain during this latter portion of the pulse. At lower repetition rates, for example pulse profile 712 associated with 30 kHz, the slope of the modulated optical signal is reduced with respect to pulse profile 708, which displays less roll-off in the gain at this lower repetition rate. Thus, by providing an input pulse profile with the appropriate shape, the desired output pulse profile is obtained. Although pulse profiles 708, 710, and 712 are illustrated for three repetition rates (for example, as detected by monitoring the client trigger signal), the gain of the amplifiers could also be taken into account, using these pulse profiles or additional pulse profiles stored in the memory.

When implemented in software, the elements of the invention are essentially the code segments which perform the necessary tasks. The program or code segments can be stored in a processor-readable medium. The processor-readable medium, also referred to as a computer-readable medium may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may also be downloaded via computer networks such as the Internet, Intranet, etc.

Figure 8:
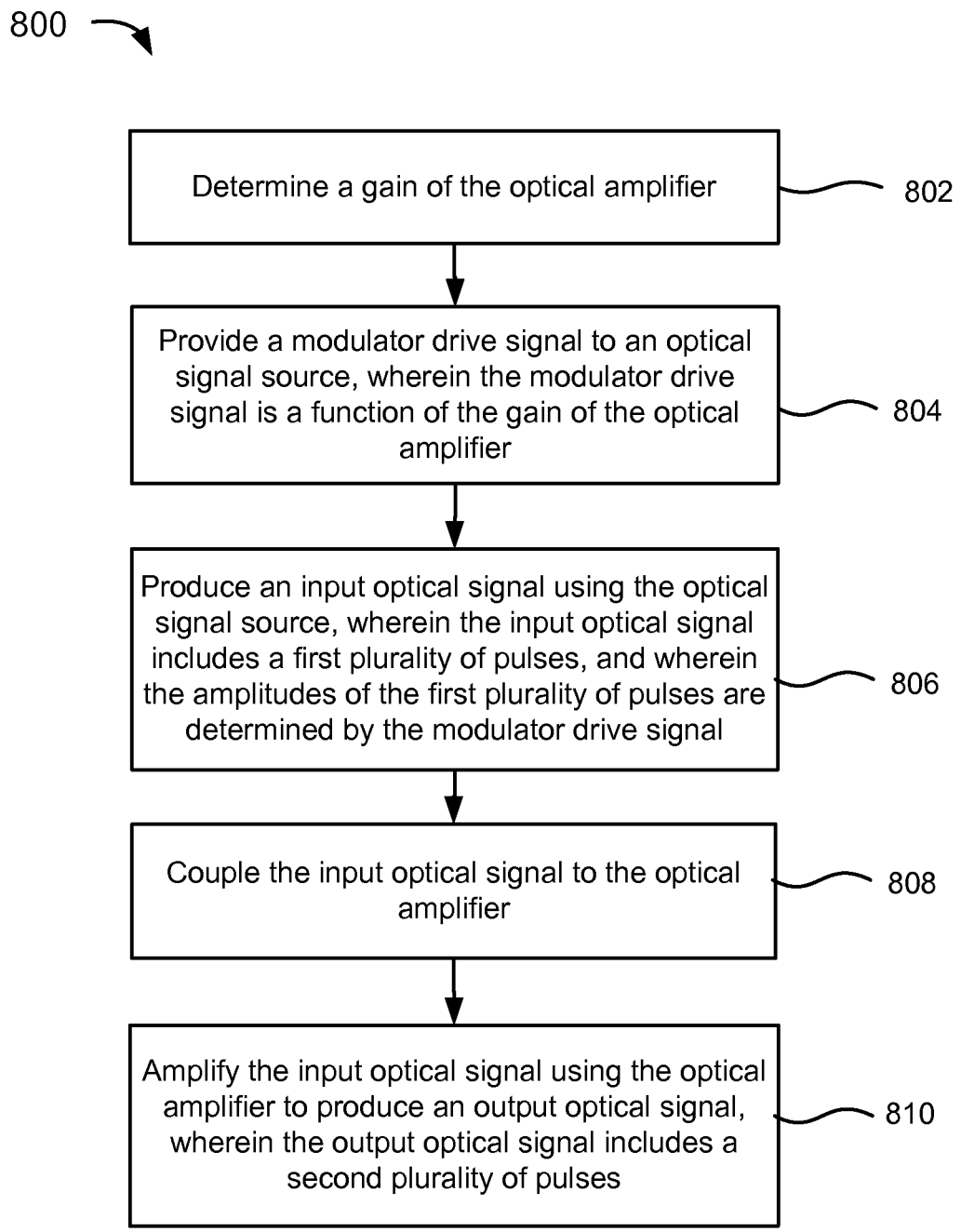
FIG. 8 is a simplified flowchart illustrating a method of operating an optical amplifier according to an embodiment of the present invention.

FIG. 8 is a simplified flowchart illustrating a method of operating an optical amplifier according to an embodiment of the present invention. The method 800 includes determining a gain of the optical amplifier (802) and providing a modulator drive signal to an optical signal source (804). The modulator drive signal is a function of the gain. The method 800 further includes producing an input optical signal using the optical signal source (806). The input optical signal includes a first plurality of pulses. The amplitudes of the first plurality of pulses are related to the modulator drive signal. The method further includes coupling the input optical signal into the optical amplifier (808) and amplifying the input optical signal using the optical amplifier to produce an output optical signal (810). The output optical signal includes a second plurality of pulses. In some embodiments of the present invention, the input signal is amplified by about 20 dB to about 30 dB.

According to an embodiment, determining a gain of the optical amplifier includes detecting a feedback signal related to the gain of the optical amplifier. According to an embodiment, the optical amplifier is a rare-earth doped fiber amplifier. The rare-earth doping is typically ytterbium for amplification of light in wavelength range between 980 nm and 1100 nm. Other rare-earth elements, such as erbium or neodymium, can be used for amplification at other wavelengths. According to embodiments of the present invention, the rare-earth doped optical fiber can be single-clad, double-clad, or multi-clad. It can also be a polarization maintaining fiber. The optical amplifier 206 may be a single-stage optical amplifier, or may be a multiple-stage optical amplifier. According to an embodiment, the feedback signal includes a forward-propagating ASE signal or a reverse-propagating ASE signal separated from the output or from the input of the optical amplifier, respectively.

According to an alternative embodiment, determining a gain of the optical amplifier includes receiving a trigger signal. The trigger signal includes a third plurality of pulses with a particular pulse sequence. The gain of the optical amplifier is determined based on the pulse sequence of the trigger signal. According to an embodiment, providing a modulator drive signal includes, under the control of a processor, selecting a pulse profile from a plurality of pulse profiles stored in a memory according to the gain of the optical amplifier and providing a modulator drive signal according to the selected pulse profile. According to an embodiment, producing an input optical signal includes modulating a seed optical signal provided by the optical signal source.

It should be appreciated that the specific steps illustrated in FIG. 8 provide a particular method of operating an optical amplifier according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
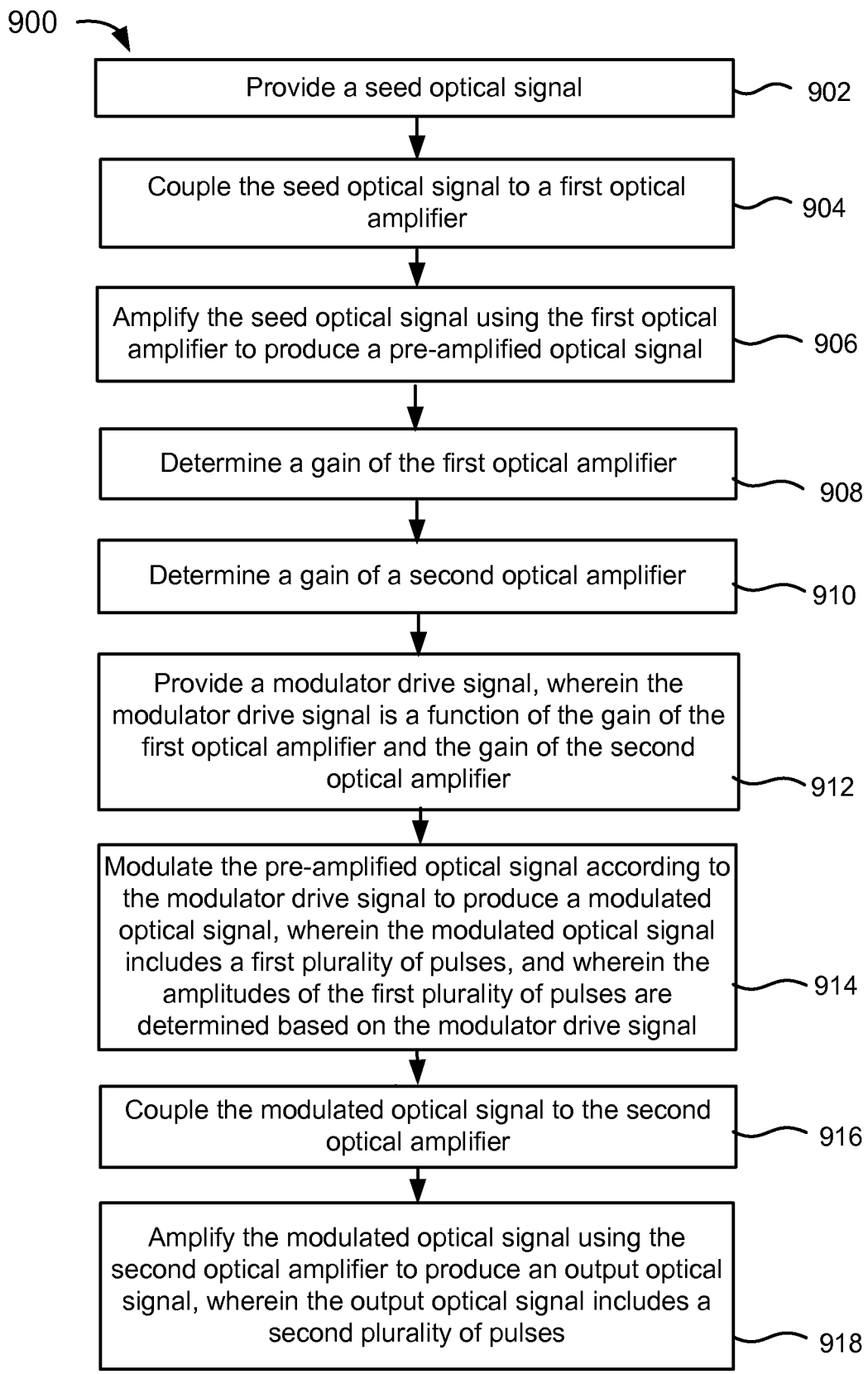
FIG. 9 is a simplified flowchart illustrating a method of operating an optical system according to an embodiment of the present invention.

FIG. 9 is a simplified flowchart illustrating a method 900 of operating an optical system according to an embodiment of the present invention. The method 900 includes providing a seed optical signal (902) and coupling the seed optical signal to a first optical amplifier (904). The method 900 further includes amplifying the seed optical signal using the first optical amplifier to produce a pre-amplified optical signal (906). The method 900 further includes determining a gain of the first optical amplifier (908) and determining a gain of a second optical amplifier (910). The method 900 further includes providing a modulator drive signal (912). The modulator drive signal is a function of the gain of the first optical amplifier and the gain of the second optical amplifier. The method 900 further includes modulating the pre-amplified optical signal according to the modulator drive signal to produce a modulated optical signal (914). The modulated optical signal includes a first plurality of pulses. The amplitudes of the first plurality of pulses are determined by the modulator drive signal. The method 900 further includes coupling the modulated optical signal to the second optical amplifier (916) and amplifying the modulated optical signal using the second optical amplifier to produce an output optical signal (918). The output optical signal includes a second plurality of pulses.

According to an embodiment, determining a gain of the first optical amplifier (908) includes detecting a first feedback signal related to the gain of the first optical amplifier, and determining a gain of a second optical amplifier includes detecting a second feedback signal related to the gain of the second optical amplifier. According to an embodiment, each of the first and second optical amplifiers is a rare-earth doped fiber amplifier, and each of the first and second feedback signals comprises an ASE signal.

According to an alternative embodiment, each of determining a gain of the first optical amplifier (908) and determining a gain of the second optical amplifier (910) includes receiving a trigger signal. The trigger signal includes a third plurality of pulses with a particular pulse sequence. Each of the gain of the first optical amplifier and the gain of the second optical amplifier is determined based on the sequence of the trigger signal. According to an embodiment, providing a modulator drive signal (912) includes, under the control of a processor, selecting a pulse profile from a plurality of pulse profiles stored in a memory according to the gain of the first optical amplifier and the gain of the second optical amplifier, and providing a modulator drive signal according to the selected pulse profile.

It should be appreciated that the specific steps illustrated in FIG. 9 provide a particular method of operating an optical system according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
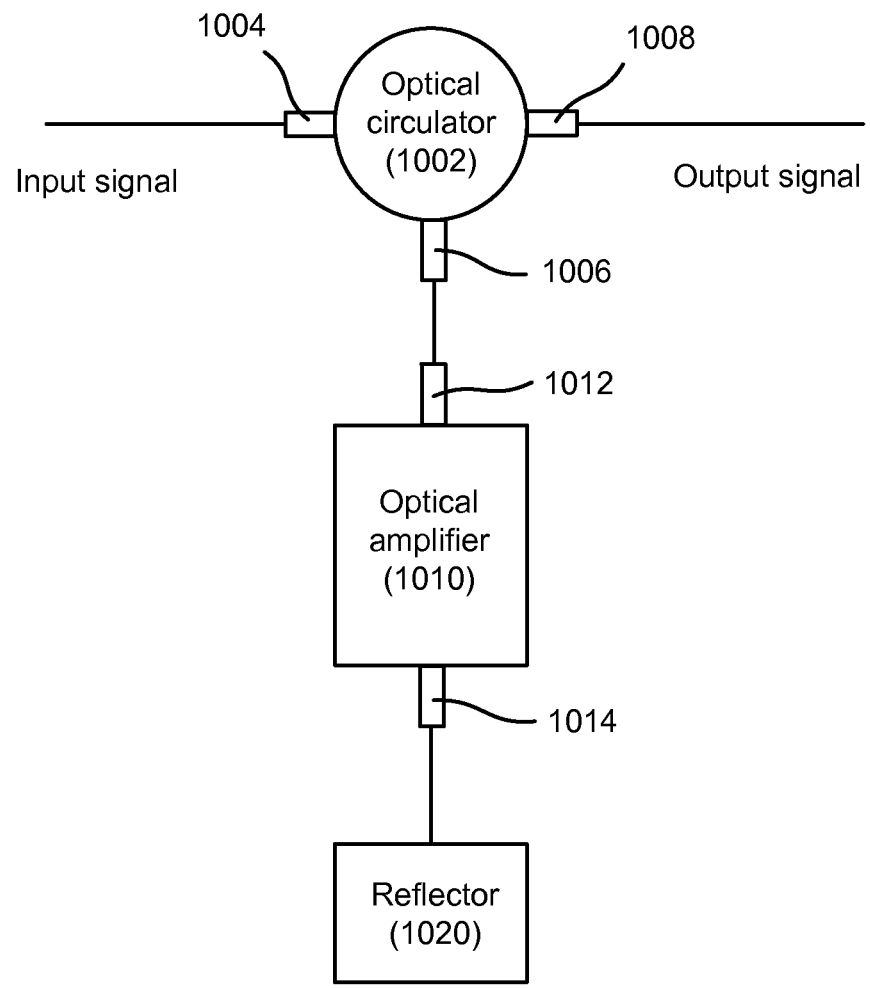
FIG. 10 is a simplified block diagram illustrating an exemplary configuration of a double-pass optical amplifier according to an embodiment of the present invention.

According various embodiments, an optical amplifier may be configured as a single-pass optical amplifier as shown in FIGS. 2-4, or as a double-pass optical amplifier. FIG. 10 illustrates an exemplary configuration of a double-pass optical amplifier 1010 utilizing an optical circulator 1002 and a reflector 1020, according to an embodiment of the present invention. The optical circulator 1002 includes a first port 1004, a second port 1006, and a third port 1008. A first end 1012 of the optical amplifier 1010 is coupled to the second port 1006 of the optical circulator 1002. A second end 1014 of the optical amplifier 1010 is coupled to the reflector 1020. An input signal is coupled into the first port 1004 of the optical circulator 1002. After passing through the optical circulator 1002, the signal exits from the second port 1006 the optical circulator 1002 and impinges on the first end 1012 of the optical amplifier 1014. The signal then passes for a first time through the optical amplifier 1010, where it is amplified. The signal emerging from the second end 1014 of the optical amplifier 1010 then impinges on the reflector 1020, and is reflected back into the optical amplifier 1010. The signal passes for a second time through the optical amplifier 1010, where the signal is amplified again. The signal emerging from the first end 1012 of the optical amplifier 1010 is coupled into the second port 1006 of the optical circulator 1002. After passing through the optical circulator 1002, the signal exits from the third port 1008 of the optical circulator 1002. According to various embodiments, the reflector 1020 may be a mirror or a fiber Bragg grating (FBG). Other configurations of a double-pass optical amplifier may be used. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical amplifier, the method comprising:
   determining a gain of the optical amplifier;
   providing a modulator drive signal to an optical signal source, wherein the modulator drive signal is a function of the gain of the optical amplifier;
   producing an input optical signal using the optical signal source, wherein the input optical signal includes a first plurality of pulses, each of the first plurality of pulses having an amplitude related to the modulator drive signal;
   coupling the input optical signal to the optical amplifier; and
   amplifying the input optical signal using the optical amplifier to produce an output optical signal including a second plurality of pulses.

2. The method of claim 1 wherein the amplitude of the first plurality of pulses is characterized by a temporal amplitude profile.

3. The method of claim 1 wherein the optical amplifier comprises a doped fiber amplifier.

4. The method of claim 1 wherein determining a gain of the optical amplifier comprises detecting a feedback signal related to the gain of the optical amplifier.

5. The method of claim 4 wherein the feedback signal comprises an amplified spontaneous emission (ASE) signal.

6. The method of claim 5 wherein the ASE signal is at least one of a forward-propagating ASE signal or a reverse-propagating ASE signal.

7. The method of claim 4 wherein detecting a feedback signal comprises separating light at wavelengths other than a wavelength of the input optical signal from light at the wavelength of the input optical signal.

8. The method of claim 1 wherein determining a gain of the optical amplifier comprises:
   receiving a trigger signal, wherein the trigger signal includes a third plurality of pulses; and
   determining the gain of the optical amplifier based on a sequence of the third plurality of pulses.

9. The method of claim 1 wherein providing a modulator drive signal comprises:
   selecting a pulse profile from a plurality of pulse profiles stored in a memory using the gain of the optical amplifier; and
   providing a modulator drive signal based on the selected pulse profile.

10. The method of claim 1 wherein producing an input optical signal providing a seed optical signal; and
    modulating the seed optical signal.

11. A method of operating an optical system, the method comprising:
    providing a seed optical signal;
    coupling the seed optical signal into a first optical amplifier;
    amplifying the seed optical signal using the first optical amplifier to produce a pre-amplified optical signal;
    determining a gain of the first optical amplifier;
    determining a gain of a second optical amplifier;
    providing a modulator drive signal to an optical modulator, wherein the modulator drive signal is a function of the gain of the first optical amplifier and the gain of the second optical amplifier;
    modulating the pre-amplified optical signal using the optical modulator to produce a modulated optical signal that includes a first plurality of pulses, each of the first plurality of pulses being characterized by an amplitude that is a function of the modulator drive signal;
    coupling the modulated optical signal into the second optical amplifier; and
    amplifying the modulated optical signal using the second optical amplifier to produce an output optical signal including a second plurality of pulses.

12. The method of claim 11 wherein the amplitude of the first plurality of pulses is characterized by a temporal amplitude profile.

13. The method of claim 11 wherein:
    determining a gain of the first optical amplifier comprises detecting a first feedback signal related to the gain of the first optical amplifier; and
    determining a gain of a second optical amplifier comprises detecting a second feedback signal related to the gain of the second optical amplifier.

14. The method of claim 13 wherein each of the first and second feedback signals comprises an ASE signal.

15. The method of claim 11 wherein determining a gain of the first optical amplifier and determining a gain of a second optical amplifier comprise:
    receiving a trigger signal, wherein the trigger signal includes a third plurality of pulses; and
    determining the gain of the first optical amplifier and the gain of the second optical amplifier based on a sequence of the third plurality pulses.

16. The method of claim 11 wherein providing a modulator drive signal comprises:
    selecting a pulse profile from a plurality of pulse profiles stored in a memory based, in part, on the gain of the first optical amplifier and the gain of the second optical amplifier; and
    providing a modulator drive signal based, in part, on the selected pulse profile.

17. An optical amplifier system comprising:
    an optical signal source, including a modulator, operable to provide an input optical signal comprising a first plurality of pulses, wherein each of the first plurality of pulses of the input optical signal is characterized by a temporal amplitude profile that is a function of a modulator drive signal applied to the modulator;
    control electronics coupled to the optical signal source;
    an optical amplifier operable to amplify the input optical signal, the optical amplifier having an input and an output, wherein the optical signal source is optically coupled to the input; and
    a feedback loop coupled to at least one of the output of the optical amplifier or the input of the optical amplifier and operable to receive a feedback signal related to a gain of the optical amplifier, wherein the feedback signal is coupled to the control electronics, the control electronics are operable to provide the modulator drive signal based on the feedback signal.

18. An optical amplifier system comprising:
    an optical signal source, including a modulator, operable to provide an input optical signal comprising a first plurality of pulses, wherein each of the first plurality of pulses of the input optical signal is characterized by a temporal amplitude profile that is a function of a modulator drive signal applied to the modulator;

control electronics coupled to the optical signal source;

an optical amplifier operable to amplify the input optical signal, the optical amplifier having an input and an output, wherein the optical signal source is optically coupled to the input; and a feedback loop coupled to at least one of the output of the optical amplifier or the input of the optical amplifier and operable to receive a feedback signal related to a gain of the optical amplifier, wherein the feedback signal is coupled to the control electronics, the control electronics are operable to provide the modulator drive signal based on the feedback signal, wherein the control electronics comprises a processor, a memory having a plurality of pulse profiles stored therein, and a digital to analog converter (DAC) coupled to the processor, wherein the processor selects a pulse profile from the plurality of pulse profiles stored in the memory according to the feedback signal, and the DAC provides the modulator drive signal based on the selected pulse profile.

19. The optical system of claim 17 wherein the optical amplifier comprises a doped fiber optical amplifier and the feedback signal comprises a forward-propagating or a reverse-propagating ASE signal.

20. An optical system comprising:

an optical signal source operable to provide a seed optical signal;

an optical modulator operable to modulate the seed optical signal to produce a modulated optical signal comprising a first plurality of pulses;

control electronics operable to provide a modulating drive signal to the optical modulator;

an optical amplifier operable to amplify the modulated optical signal, the optical amplifier having an input and an output, wherein the input of the optical amplifier is coupled to an output of the optical modulator; and a feedback loop coupled to the output or the input of the optical amplifier and operable to detect a feedback signal related to a gain of the optical amplifier, wherein the feedback signal is coupled to the control electronics, and the control electronics are operable to provide the modulator drive signal based on the feedback signal, and wherein the amplitudes of the first plurality of pulses of the modulated optical signal are a function of the modulator drive signal.

21. The system of claim 20 wherein the optical amplifier comprises a doped fiber amplifier.

22. The system of claim 20 wherein the feedback signal comprises an ASE signal.

23. An optical system comprising:

an optical signal source operable to provide a seed optical signal;

an optical modulator operable to modulate the seed optical signal to produce a modulated optical signal comprising a first plurality of pulses;

control electronics operable to provide a modulating drive signal to the optical modulator;

an optical amplifier operable to amplify the modulated optical signal, the optical amplifier having an input and an output, wherein the input of the optical amplifier is coupled to an output of the optical modulator; and a feedback loop coupled to the output or the input of the optical amplifier and operable to detect a feedback signal related to a gain of the optical amplifier, wherein the feedback signal is coupled to the control electronics, and the control electronics are operable to provide the modulator drive signal based on the feedback signal, and wherein the amplitudes of the first plurality of pulses of the modulated optical signal are a function of the modulator drive signal, wherein the control electronics comprises a processor, a memory having a plurality of pulse profiles stored therein, and a digital to analog converter (DAC) coupled to the processor, wherein the processor is operable to select a pulse profile from the plurality of pulse profiles stored in the memory based on the feedback signal, and the DAC is operable to provide the modulator drive signal based on the selected pulse profile.

24. An optical system comprising:

an optical signal source operable to produce a seed optical signal;

a first optical amplifier operable to pre-amplify the seed optical signal to produce a pre-amplified optical signal, the first optical amplifier having an input and an output, wherein the input of the first optical amplifier is coupled to the optical signal source;

an optical modulator coupled to the output of the first optical amplifier and operable to modulate the pre-amplified optical signal to produce a modulated optical signal comprising a first plurality of pulses;

control electronics operable to provide a modulating drive signal to the optical modulator;

a second optical amplifier operable to amplify the modulated optical signal, the second optical amplifier having an input and an output, wherein the input of the second optical amplifier is coupled to an output of the optical modulator;

a first feedback loop coupled to the output or the input of the first optical amplifier and operable to detect a first feedback signal related to a gain of the first optical amplifier; and a second feedback loop coupled to the output or the input of the second optical amplifier and operable to detect a second feedback signal related to a gain of the second optical amplifier;

wherein the first feedback signal and the second feedback signal are coupled to the control electronics, and the control electronics are operable to provide the modulator drive signal based on the first feedback signal and the second feedback signal, and wherein the amplitudes of the first plurality of pulses of the modulated optical signal are a function of the modulator drive signal.

25. The optical system of claim 24 wherein each of the first optical amplifier and the second optical amplifier comprises a doped fiber amplifier.

26. The optical system of claim 24 wherein each of the first feedback signal and the second feedback signal comprises an ASE signal.

27. The optical system of claim 24 wherein the control electronics comprises a processor, a memory having a plurality of pulse profiles stored therein, and a digital to analog converter (DAC) coupled to the processor, wherein the processor is operable to select a pulse profile from the plurality of pulse profiles stored in the memory based on the first feedback signal and the second feedback signal, and the DAC is operable to provide the modulator drive signal based on the selected pulse profile.

* * * * *